United States Patent
Tsirkin

(10) Patent No.: US 12,346,429 B2
(45) Date of Patent: Jul. 1, 2025

(54) AUTOMATICALLY INPUTTING AN AUTHENTICATION CODE FOR AN AUTHENTICATION PROCESS

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 267 days.

(21) Appl. No.: 18/080,414

(22) Filed: Dec. 13, 2022

(65) Prior Publication Data

US 2024/0193257 A1  Jun. 13, 2024

(51) Int. Cl.
| | | |
|---|---|---|
| H04L 29/00 | (2006.01) | |
| G06F 21/45 | (2013.01) | |
| H04L 9/08 | (2006.01) | |
| H04L 9/32 | (2006.01) | |

(52) U.S. Cl.
CPC ............ *G06F 21/45* (2013.01); *H04L 9/0863* (2013.01); *H04L 9/3228* (2013.01)

(58) Field of Classification Search
CPC .......... G06F 21/45; G06F 21/32; G06F 21/40; G06F 9/547; G06F 9/4451; H04L 9/0863; H04L 9/3228; H04L 2463/082; H04L 63/0838; H04L 63/0861; H04W 4/12
See application file for complete search history.

(56) References Cited

U.S. PATENT DOCUMENTS

| | | | |
|---|---|---|---|
| 9,032,498 B1 * | 5/2015 | Ben Ayed | G06F 21/35 726/9 |
| 9,332,008 B2 | 5/2016 | Burch et al. | |
| 9,596,223 B1 * | 3/2017 | Mezei | H04L 63/0838 |
| 9,736,147 B1 * | 8/2017 | Mead | G06F 21/31 |
| 9,979,719 B2 | 5/2018 | Oberheide et al. | |
| 10,333,914 B2 | 6/2019 | Mezei et al. | |
| 10,812,473 B2 | 10/2020 | Ramesh Kumar et al. | |

(Continued)

OTHER PUBLICATIONS

Anonymous, "Touch triggered OTP," dev.yubico, retrieved Oct. 21, 2022: pp. 1-10, <https://developers.yubico.com/Developer_Program/Guides/Touch_triggered_OTP.html>.

(Continued)

*Primary Examiner* — Don G Zhao
(74) *Attorney, Agent, or Firm* — Kilpatrick Townsend & Stockton LLP

(57) ABSTRACT

An authentication code for an authentication process such as multifactor authentication can be automatically inputted according to some examples described herein. In one example, a computing device can execute an authenticator application to generate an authentication code for use during an authentication process associated with a user logging into an account. The computing device can establish a connection with a target device that is separate from the computing device. The target device may be configured to display a graphical user interface that includes an input box into which the user is to manually type the authentication code as part of the authentication process. The computing device can transmit the authentication code to the target device via the connection. The target device can be configured to receive the authentication code and automatically enter the authentication code into the input box on behalf of the user.

20 Claims, 5 Drawing Sheets

(56) References Cited

U.S. PATENT DOCUMENTS

| | | | | |
|---|---|---|---|---|
| 2008/0313714 A1* | 12/2008 | Fetterman | ............. | H04L 67/146 |
| | | | | 726/4 |
| 2009/0119754 A1* | 5/2009 | Schubert | ............. | H04W 12/062 |
| | | | | 726/4 |
| 2010/0183130 A1* | 7/2010 | Lin | ................... | H04L 63/1416 |
| | | | | 379/93.02 |
| 2012/0202464 A1* | 8/2012 | Sakai | ..................... | H04W 8/22 |
| | | | | 455/418 |
| 2013/0042310 A1* | 2/2013 | Najafi | .................... | G06F 21/31 |
| | | | | 726/7 |
| 2014/0129493 A1* | 5/2014 | Leopold | ................. | G06F 16/26 |
| | | | | 707/603 |
| 2015/0256530 A1* | 9/2015 | Semba | ............... | H04W 12/069 |
| | | | | 726/5 |
| 2015/0269369 A1* | 9/2015 | Hamid | ................... | G06F 21/45 |
| | | | | 726/5 |
| 2015/0271164 A1* | 9/2015 | Hamid | ............... | H04L 63/0853 |
| | | | | 726/7 |
| 2016/0080938 A1* | 3/2016 | Kim | ..................... | H04W 12/08 |
| | | | | 726/5 |
| 2017/0012959 A1* | 1/2017 | Sierra | ................... | H04L 63/104 |
| 2017/0149873 A1* | 5/2017 | Jang | .................... | H04L 67/1095 |
| 2017/0353525 A1* | 12/2017 | Choi | ................... | H04W 12/068 |
| 2017/0357799 A1 | 12/2017 | Fehér et al. | | |
| 2018/0089460 A1* | 3/2018 | Kirk | ........................ | H04W 4/40 |
| 2019/0043281 A1* | 2/2019 | Aman | ................... | G07C 9/215 |
| 2020/0169415 A1* | 5/2020 | Schmidt | ................ | H04L 9/3247 |
| 2020/0396195 A1* | 12/2020 | Goel | ....................... | H04L 51/58 |
| 2021/0014219 A1* | 1/2021 | Nair | ...................... | H04L 9/0863 |
| 2022/0029962 A1* | 1/2022 | Teo | ..................... | H04L 63/0838 |
| 2022/0084331 A1* | 3/2022 | Matsunaga | ........... | B60W 40/09 |
| 2022/0272536 A1 | 8/2022 | Anderson | | |
| 2022/0327199 A1* | 10/2022 | Papadopoulos | ..... | H04W 12/068 |
| 2023/0032366 A1* | 2/2023 | Lee | ........................ | H04W 12/50 |
| 2024/0073204 A1* | 2/2024 | Jarvis | ..................... | G06F 21/45 |

OTHER PUBLICATIONS

Dressel et al., "SecuriCast: Zero-Touch Two-Factor Authentication using WebBluetooth," Proceedings of the ACM SIGCHI Symposium on Engineering Interactive Computing Systems, EICS 2019, Association for Computing Machinery, Jun. 18, 2019: pp. 1-6.

* cited by examiner

AUTOMATICALLY INPUTTING AN AUTHENTICATION CODE FOR AN AUTHENTICATION PROCESS

TECHNICAL FIELD

The present disclosure relates generally to information security. More specifically, but not by way of limitation, this disclosure relates to automatically inputting an authentication code for an authentication process, such as a single-factor or multifactor authentication process.

BACKGROUND

Multifactor authentication (MFA) is an electronic authentication process in which an entity is granted access to a restricted item (e.g., a website or application) after successfully presenting two or more validation factors to an authentication mechanism. The validation factors can include a knowledge factor, a possession factor, or an inherence factor unique to the entity. Examples of a knowledge factor can include a username, password, or PIN code. Examples of a possession factor can include a badge or smartphone. Examples of an inherence factor include biometric information like fingerprints. The likelihood that the entity possesses an asserted identity is greater when more factors are validated by the authentication mechanism. Single-factor authentication requires only one validation factor and is therefore less secure than multifactor authentication. Two-factor authentication is a type of MFA that requires two validation factors. For example, the entity can supply a knowledge factor (e.g., a set of credentials) and a possession factor or an inherence factor.

One of the most common validation factors that users encounter are one-time passwords (OTPs). OTPs are normally 4-8 digit codes that a user may receive via an e-mail, a short message service (SMS) message, or a mobile application. A time-based one-time password (TOTP) is a temporary one-time password generated by an algorithm. Normally, a TOTP is generated based on the current time of day (e.g., the current time can be a source of uniqueness for the TOTP). Using the one-time password during an authentication process can require the entity to enter the one-time code into an input box, which may be part of a graphical interface for an application or webpage.

DETAILED DESCRIPTION

Figure 1:
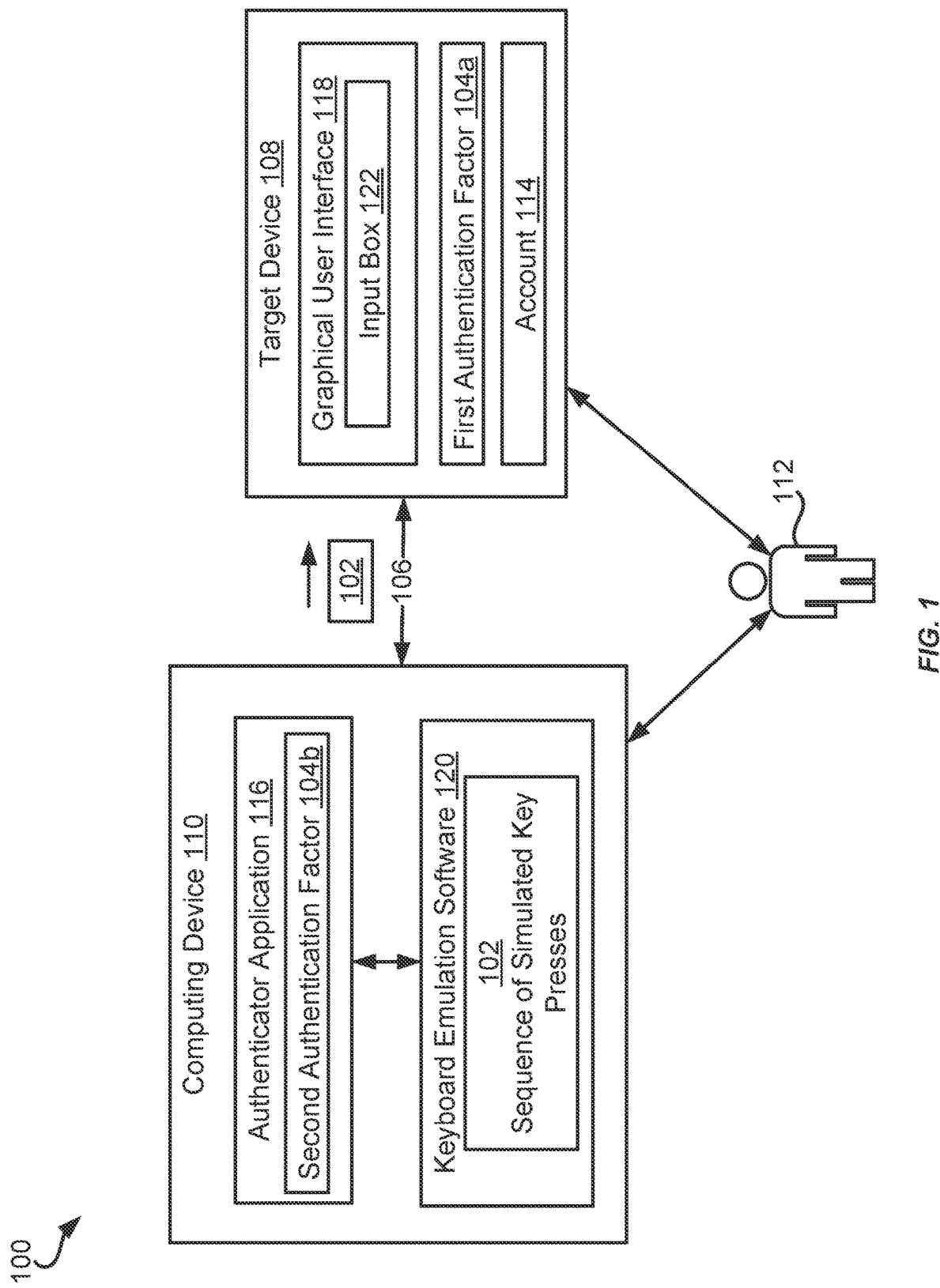
FIG. 1 is a block diagram of an example of a system for automatically inputting an authentication code for an authentication process according to one example of the present disclosure.

A system may implement an authentication process such as multifactor authentication (MFA) to verify an identity of a user before enabling the user to access protected computing resources (e.g., files, applications, webpages). During an MFA process, the user may input a first authentication factor, such as a personal identification number (PIN), into a target device before being prompted to input a second authentication factor. Examples of the target device may be a laptop computer or a desktop computer. The second authentication factor can include an authentication code that is generated using an authenticator application executing on a secondary device, such as a mobile phone. When manually entering the authentication code into the target device, it is common for users to make mistakes. For example, a user may make a mistake when reading or inputting the authentication code. To reduce a likelihood of mistakes associated with entering the authentication code, the authentication code may have a limited length or may exclude characters that are relatively difficult to distinguish or input. But, having a limited length or excluding the characters can decrease effectiveness of the authentication code against malicious attacks, such as guessing or brute-force attacks. Similar problems can arise during a single-factor authentication process that requires an authentication code from an authenticator application.

The abovementioned challenges can be amplified in certain contexts, for example if the authentication code is available for a limited amount of time. In such examples, the likelihood of the user incorrectly entering the authentication code can increase as a result of increased pressure and input speed. Additionally, if the authentication codes are single-use codes, the user may become frustrated by needing to input a different authentication code each time the user makes a mistake. Frustrations with entering the authentication code may cause the user to bypass MFA, for example by remaining logged into the protected computing resources for an extended period of time, thereby increasing a risk of the protected computing resources being compromised.

Some examples of the present disclosure can overcome one or more of the issues mentioned above by automatically inputting an authentication code for during an authentication process such as a single-factor or multifactor authentication process. For example, to access protected computing resources, the user may submit the first authentication factor into a target device. After validating the first authentication factor, the target device can request the second authentication factor from the user. The user can use a secondary device to obtain the second authentication factor. For example, the user can execute an authenticator application on the secondary device to generate a one-time passcode. But instead of manually inputting the second authentication factor into the target device, the user can operate the secondary device to establish a wired or wireless connection with the target device. The secondary device can then transmit the authentication code over the connection to the target device. Transmitting the authentication code to the target device via the connection can prevent user error associated with reading or manually inputting the authentication code. After receiving the authentication code, the target device can automatically input the authentication code (e.g., into an input box) to verify the identity of the user, thereby enabling the user to access the protected computing resources. Automatically inputting the authentication code can be relatively quick, which can encourage the user to implement the MFA process, rather than attempt to bypass the MFA process due to frustration or inconvenience.

In one particular example, a user may use a target device to log into an account hosted on an account server, for example to access protected computing resources. The target device can communicate with the account server via a network, such as the Internet. To help secure the login process, the system may perform multifactor authentication. During the MFA process, the user can input a first authentication factor to the target device for verification. If the first authentication factor is deemed valid, the system can request a second authentication factor. For example, the target device can generate a graphical user interface (GUI) that includes an input box in which the user can input a secondary authentication factor, such as an authentication code generated via a secondary device. The second authentication factor can serve as an additional security layer in the MFA process.

To provide the second authentication factor to the target device, the user can establish a connection between the secondary device and the target device. The secondary device can then transmit the second authentication factor to the target device. In some examples, the second authentication factor can be an authentication code generated by an authenticator application on the secondary device. The secondary device can transmit the authentication code to the target device via the connection using any suitable technique.

In some examples, the secondary device can leverage keyboard emulation software to convert the authentication code into a sequence of simulated key presses and transmit the sequence of simulated key presses to the target device, so that the target device can input the second authentication factor as the sequence of simulated key presses. For instance, the secondary device can leverage a Bluetooth keyboard library to transmit the authentication code to the target device as a sequence of simulated key presses, which can simulate a user manually typing the authentication code on a Bluetooth-connected keyboard. But instead of the user manually inputting the second authentication factor, the target device can receive the sequence of simulated key presses from the secondary device via the connection and automatically input the second authentication factor into the input box of the GUI.

Additionally or alternatively, the keyboard simulation software may execute on the target device to convert the authentication code received from the secondary device into the sequence of simulated key presses. That is, instead of generating and transmitting the sequence of simulated key presses, the secondary device can transmit the authentication code (e.g., in its raw format as generated by the authenticator application) to the target device. The target device can then use the keyboard simulation software to convert the authentication code into the sequence of simulated key presses, to enter the authentication code into the input box and thereby verify the identity of the user. After the authentication code is validated, the user can access the protected computing resources, such as the account. For example, the account server hosting the account may validate the authentication code prior to granting the user access to the protected computing resources.

While the above example involved the authentication code being the second factor in a multifactor authentication process, this is intended to be illustrative and non-limiting.

In other examples, the authentication code can serve as another factor in a multifactor authentication process. For instance, the authentication code may be a first factor or a third factor in a multifactor authentication process. Alternatively, the authentication code may be the sole factor in a single-factor authentication process. Regardless, similar principles can be applied to allow the system to automatically input the authentication code on behalf of the user.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for automatically inputting an authentication code for an authentication process according to one example of the present disclosure. The system 100 can include a target device 108 and a computing device 110. Examples of the target device 108 can include a laptop computer, desktop computer, mobile phone, or tablet. Examples of the computing device 110 can include a smart phone, desktop computer, laptop computer, tablet, or wearable device, such as a smart watch.

To access an account 114 or other protected computing resource (e.g., a file, a software application, a database, etc.), a user 112 associated with the account 114 may be prompted to input a first authentication factor 104a into the target device 108. In some examples, the first authentication factor 104a can include a username, a password, a biometric marker, a personal identification number (PIN), or any combination of these. The first authentication factor 104a may have been previously selected by the user 112, for example when signing up for the account 114.

In some examples, as depicted in FIG. 1, the account 114 can be stored in the target device 108 and the target device 108 can locally validate the first authentication factor 104. Alternatively, the account 114 may be hosted on a computing system that is remote from the target device 108 and the validation can occur on a remote server. Either way, the first authentication factor 104a may be validated. In an MFA process, if the first authentication factor 104a is valid, the target device can request a second authentication factor 104b from the user 112. For example, after the first authentication factor 104a is validated, the target device 108 can transmit an authentication request to the computing device 110 for obtaining the second authentication factor 104b from the authenticator application 116.

As noted above, the user 112 may next be prompted to input a second authentication factor 104b to access the account or other protected computing resource. The second authentication factor 104b can be an authentication code, such as a numerical code, an alphanumerical code, or another type of code generated using an authenticator application 116. Additionally, the second authentication factor 104b can include one-time password authentication (e.g., event-based or time-based) to further decrease a likelihood of unauthorized access to the account 114. For example, a time-based one-time password (TOTP) can use a current time as a source of uniqueness. Normally the user 112 would manually input the second authentication factor 104b, but in some examples the second authentication factor 104b can be automatically supplied and inputted by the system 100.

More specifically, the user 112 may operate the computing device 110 to generate the second authentication factor 104b. For instance, the user 112 may operate an authenticator application 116 executing on the computing device 110 to generate an authentication code that serves as the second authentication factor 104b. In some examples, the user 112 can activate the authenticator application 116 to generate the second authentication factor 104b. For example, an activation measure implemented by the user 112 can include pressing a key on an input device (e.g., a keyboard, a mouse, touchscreen, etc.) that is communicatively coupled with the computing device 110. Pressing the key can activate the authenticator application 116 such that the authenticator application 116 generates the second authentication factor 104b. Additionally or alternatively, the activation measure can include a phone-based activation measure, such as speaking a key word or a key phrase. For example, the user 112 saying "enter the password" may activate the authenticator application 116. In some examples, the authenticator application 116 may be a mobile phone application that generates the second authentication factor 104b in response to an authentication request from the target device 108, which may be transmitted to the computing device 110 via a connection 106.

After generating the second authentication factor 104b, the computing device 110 (e.g., the authenticator application 116) can then transmit the second authentication factor 104b to the target device 108 using the connection 106. The connection 106 may be a wired connection or a wireless connection. Examples of the wireless connection can include IEEE 802.11, Bluetooth, or radio interfaces for accessing cellular telephone networks (e.g., transceiver/antenna for accessing a CDMA, GSM, UMTS, or another mobile communications network). Examples of the wired connection can include Ethernet, universal serial bus (USB), IEEE 1394, or a fiber optic interface.

In some examples, the user 112 can help establish the connection 106 to communicatively couple the computing device 110 with the target device 108. If the connection 106 is a wired connection, the user 112 may plug in a USB cable or other suitable physical connection device to connect the target device 108 with the computing device 110. If the connection 106 is a wireless connection, the user 112 may operate the computing device 110 to establish the wireless connection. For example, the user 112 may pair the computing device 110 with the target device 108 using a Bluetooth pairing mechanism or another wireless pairing mechanism. This may cause the computing device 110 and the target device 108 to establish a relationship by storing the same link key. For example, the user 112 can pair the target device 108 with the computing device 110 to establish a Bluetooth connection between the two devices. In this example, the computing device 110 can be a first Bluetooth-enabled device and the target device 108 can be a second Bluetooth-enabled. The first Bluetooth-enabled device may automatically detect the second Bluetooth-enabled device when the two devices are within a predefined proximity to one another. The user 112 can select the target device 108 from a list of Bluetooth-enabled devices in a pairing interface of the computing device 110, thereby causing the computing device 110 to transmit a connection request to the target device 108. After the connection request is accepted by the target device 108, the wireless connection between the computing device 110 and the target device 108 can be established.

After the target device 108 receives the second authentication factor 104b via the connection 106, the second authentication factor 104b can be automatically inputted into an input box 122 of a graphical user interface (GUI) 118 by the target device 108. Instead of the user 112 having to manually type in the second authentication factor 104b, the system 100 can automatically input the second authentication factor 104b as a sequence of simulated key presses 102. For example, the computing device 110 can use a keyboard emulation software 120 to stream the second authentication factor 104b as a sequence of simulated key presses 102 to the target device 108 via the connection 106. Alternatively, the target device 108 can have the keyboard emulation software 120 and use the keyboard emulation software 120 to convert the second authentication factor 104b received via the connection 106 into a sequence of simulated key presses 102.

The authenticator application 116 can be communicatively coupled with keyboard emulation software 120 to generate the sequence of simulated key presses 102 based on the second authentication factor 104b. For example, in response to the computing device 110 receiving the authentication request from the target device 108, the authenticator application 116 may generate the second authentication factor 104b and provide it to the keyboard emulation software 120. The keyboard emulation software 120 can receive the second authentication factor 104b and convert the second authentication factor 104b into the sequence of simulated key presses 102. In some examples, the sequence of simulated key presses 102 can be transmitted via the connection 106 to automatically input the second authentication factor 104b into the target device 108. For example, the target device 108 can generate a graphical user interface (GUI) 118 with an input box 122 positioned in the GUI 118 to receive the second authentication factor 104b for authenticating the identity of the user 112. As a result, the computing device 110 may not display the second authentication factor 104b to the user 112, thereby preventing a malicious actor from viewing the second authentication factor 104b (e.g., if the malicious actor is looking over the shoulder of the user 112).

As mentioned above, the authenticator application 116 may have an activation measure. As an additional layer of security, the activation measure may include requesting authentication (e.g., a biometric marker or PIN) from the user 112 before activating the authenticator application 116. In some examples, the computing device 110 can encrypt sensitive information, such as the second authentication factor 104b, using a cryptographic key (e.g., a symmetric encryption key, etc.) to generate encrypted data. Additionally, or alternatively, the connection 106 coupling the computing device 110 and the target device 108 can be encrypted. Encrypting the second authentication factor 104b before transmitting the second authentication factor 104b to the target device 108 can secure the second authentication factor 104b even if interception of the connection 106 occurs.

The computing device 110 can obtain the cryptographic key using any suitable technique. For example, the computing device 110 can generate the cryptographic key using a number generator, such as a random number generator or a pseudo-random number generator. Additionally, or alternatively, the computing device 110 may implement a key-rotation scheme so that the cryptographic key is changed relatively frequently, for example so that a unique cryptographic key is generated every hour or for each second authentication factor 104b to be secured. To use the second authentication factor 104b, the target device 108 can decrypt the encrypted data using the cryptographic key. If the encrypted data uses asymmetric encryption, a pair of cryptographic keys can be generated such that a first cryptographic key (e.g., a public key) can be used to encrypt the encrypted data, while a second cryptographic key (e.g., a private key) can be used to decrypt the encrypted data.

Figure 2:
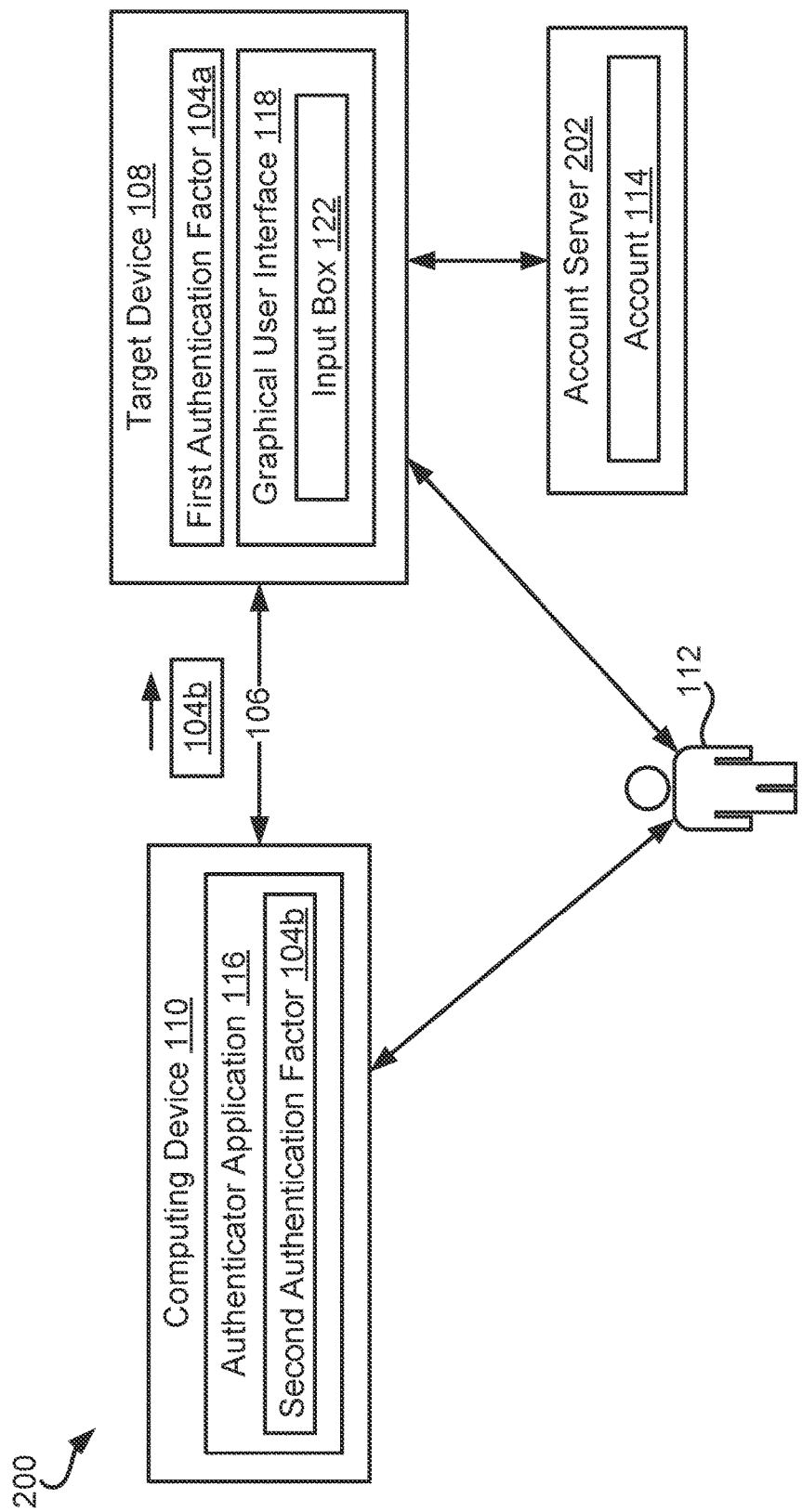
FIG. 2 is a block diagram of an example of a computing environment for automatically inputting an authentication code for an authentication process according to one example of the present disclosure.

FIG. 2 is a block diagram of an example of a computing environment 200 for automatically inputting an authentication code for an authentication process according to one example of the present disclosure. As depicted in FIG. 2, an account 114 associated with a user 112 can be hosted on a remote system and accessible via an account server 202 of the remote system. The user 112 can input a first authentication factor 104a into a target device 108 for verifying the identity of the user 112. To validate the first authentication factor 104a, the target device 108 can send a verification request containing the first authentication factor 104a to the account server 202. In some examples, the target device 108 and the account server 202 can be communicatively coupled using a network (e.g., the Internet) such that the verification request is transmitted to the account server 202 using the network. If the first authentication factor 104a is valid, the account server 202 may issue a request for a second authentication factor 104b (e.g., the authentication code) to the user 112. Accordingly, a computing device 110 in the computing environment 200 that is communicatively coupled with the target device 108 can generate the second authentication factor 104b for multifactor authentication with respect to verifying the identity of the user 112.

Figure 3:
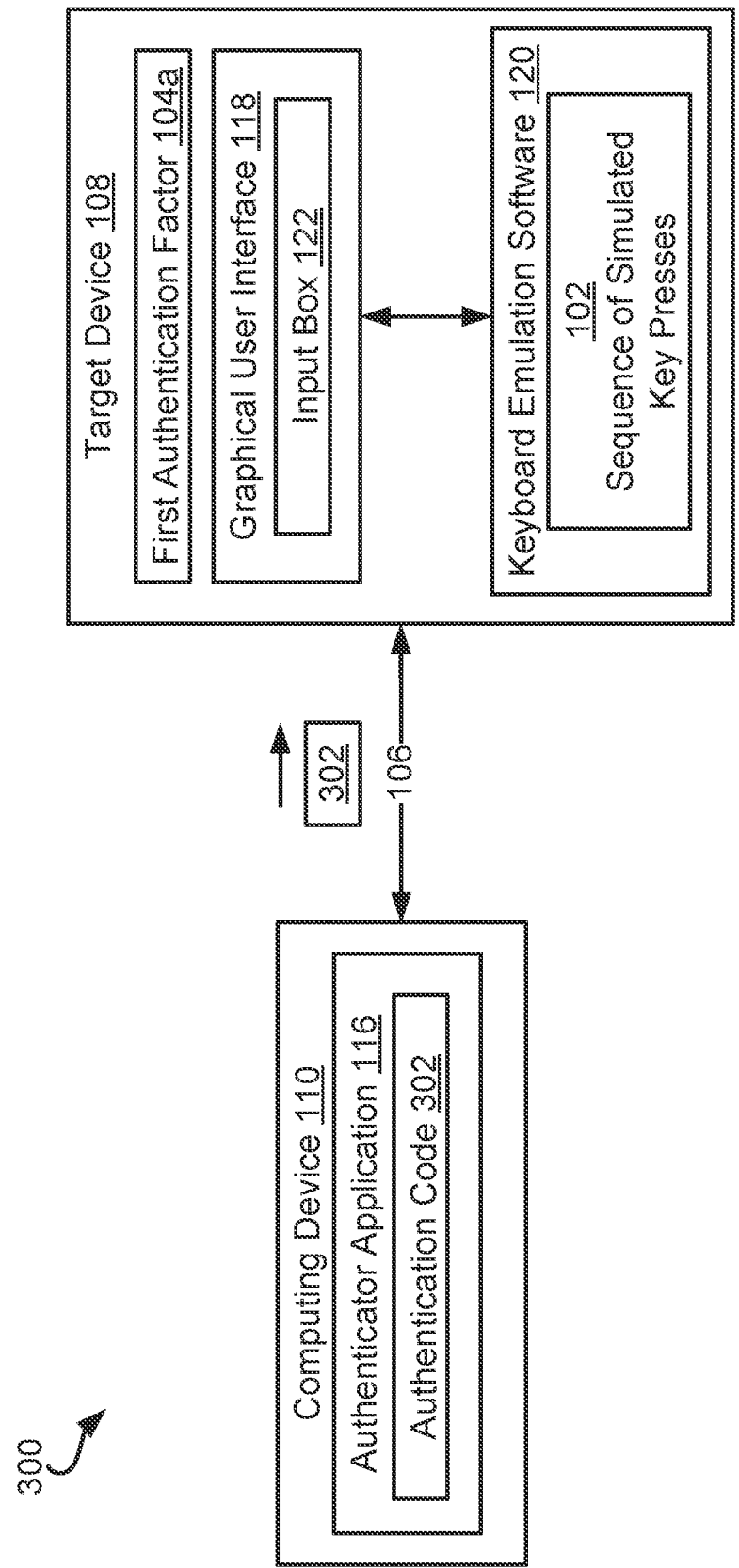
FIG. 3 is a block diagram of an example of a system for automatically inputting an authentication code for an authentication process using a sequence of simulated key presses generated by a target device according to one example of the present disclosure.

FIG. 3 is a block diagram of an example of a system 300 for automatically inputting an authentication code 302 for multifactor authentication using a sequence of simulated key presses 102 generated by a target device 108. The system 300 can include a computing device 110 communicatively coupled with the target device 108 that includes a keyboard emulation software 120 to generate the sequence of simulated key presses 102. The sequence of simulated key presses 102 can be used by the target device 108 to input the authentication code 302 as a second authentication factor 104b to control access of a user 112 to an account 114 or other suitable protected computing resources.

After a first authentication factor 104a inputted by the user 112 is verified, the target device 108 can output an authentication request to the user 112 to request the second authentication factor 104b. In some examples, the user 112 can establish a connection 106 that communicatively couples the target device 108 with the computing device 110. After the connection 106 is established, the user 112 can cause an authenticator application 116 of the computing device 110 to generate the authentication code 302 as the second authenticator factor 104b. For example, if the computing device 110 is a smart phone, the user 112 can activate the authenticator application 116 by interacting with a user interface of the authenticator application 116 or by speaking a predetermined phrase.

After generating the authentication code 302 using the authenticator application 116, the computing device 110 can transmit the authentication code 302 to the target device 108 via the connection 106. The keyboard emulation software 120 in the target device 108 can use the authentication code 302 to generate the sequence of simulated key presses 102. Additionally, the keyboard emulation software 120 can be communicatively coupled with a graphical user interface (GUI) 118 generated by the target device 108 that includes an input box 122 for inputting the authentication code 302. Instead of the user 112 having to manually input the authentication code 302 into the input box 122, the target device 108 can automatically input the authentication code 302 into the input box 122 using the sequence of simulated key presses 102. After the authentication code 302 is validated, the user 112 can obtain access to the account 114 or other suitable protected computing resources.

Figure 4:
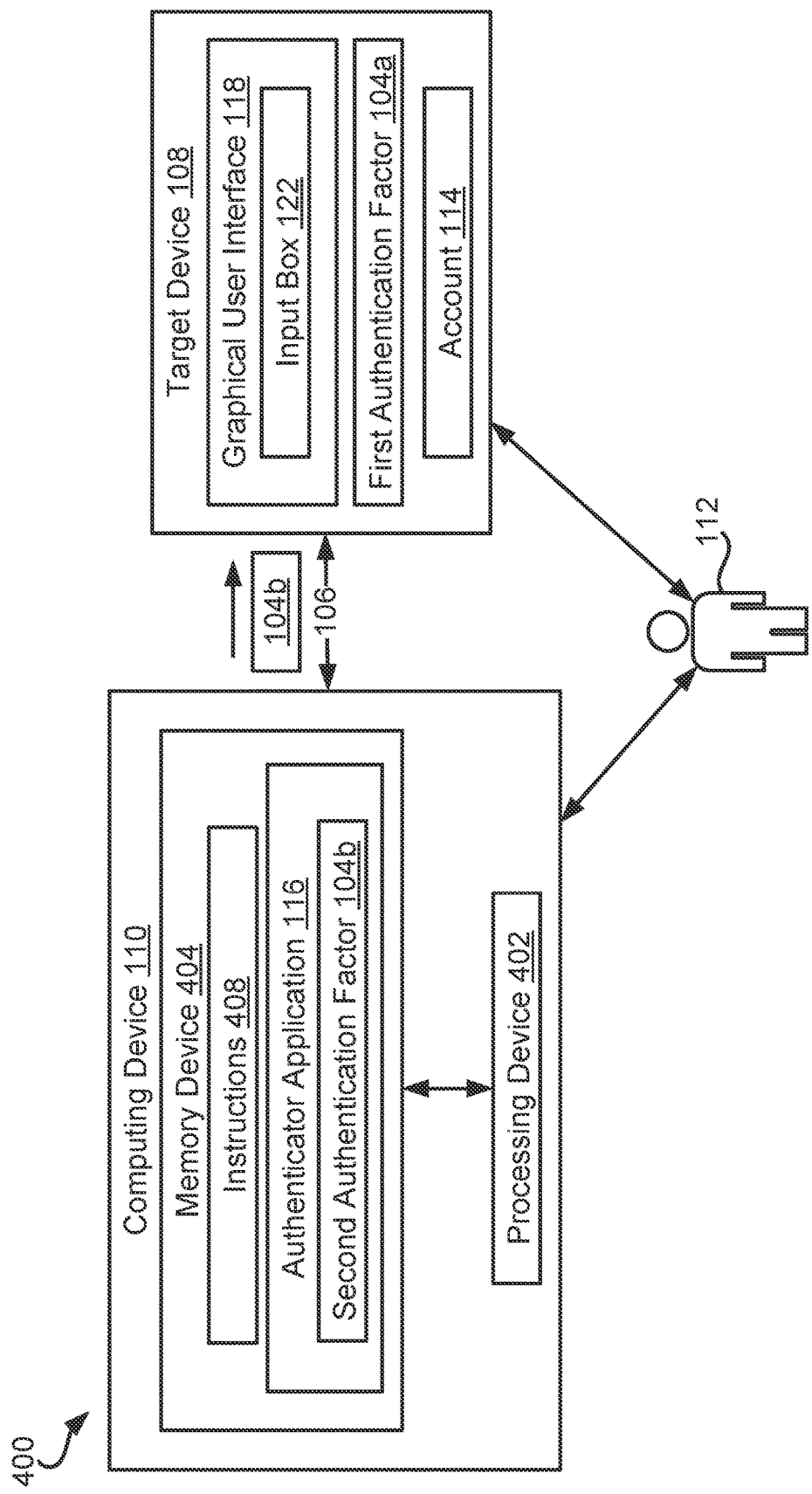
FIG. 4 is a block diagram of an example of a computing device for implementing some aspects of the present disclosure.

FIG. 4 is a block diagram of an example of a computing device 110 for implementing some aspects of the present disclosure. The computing device 110 can include a processing device 402 communicatively coupled to a memory device 404. In some examples, the computing device 110 can be a part of a computing environment 400 that includes a target device 108 communicatively coupled with the computing device 110.

The processing device 402 can include one processing device or multiple processing devices. Non-limiting examples of the processing device 402 include a Field-Programmable Gate Array (FPGA), an application-specific integrated circuit (ASIC), and a microprocessor. The processing device 402 can execute instructions 408 stored in the memory device 404 to perform operations. In some examples, the instructions 408 can include processor-specific instructions generated by a compiler or an interpreter from code written in any suitable computer-programming language, such as C, C++, C #, Java, Python, or any combination of these.

The memory device 404 can include one memory device or multiple memory devices. The memory device 404 can be non-volatile and may include any type of memory device that retains stored information when powered off. Non-limiting examples of the memory device 404 include electrically erasable and programmable read-only memory (EEPROM), flash memory, or any other type of non-volatile memory. At least some of the memory device 404 includes a non-transitory computer-readable medium from which the processing device 402 can read instructions 408. A computer-readable medium can include electronic, optical, magnetic, or other storage devices capable of providing the processing device 402 with the instructions 408 or other program code. Non-limiting examples of a computer-readable medium include magnetic disk(s), memory chip(s), ROM, random-access memory (RAM), an ASIC, a configured processing device, and optical storage.

In some examples, the processing device 402 can execute the instructions 408 to perform operations. The operations can be associated with single-factor authentication or multifactor authentication to access a protected computing resource, such as an account 114. For example, the processing device 402 can cause an authenticator application 116 to generate a second authentication factor 104b after a first authentication factor 104a is validated. A user 112 can interact with the target device 108 to input the first authentication factor 104a for verifying an identity of the user before gaining access to the account 114. For example, to access the account 114, the user 112 may input a PIN that is verified by an account server (e.g., the account server 202 of FIG. 2) hosting the account 114. In some examples, the target device 108 may provide the user 112 access to the account 114 after the first authentication factor 104a is verified.

To increase a security level associated with accessing the account 114, the target device 108 can use multifactor authentication to prevent unauthorized access or security breaches. After the first authentication factor 104a is verified, the target device 108 can request a second authentication factor 104b from the computing device 110. The processing device 402 can cause an authenticator application 116 in the computing device 110 to generate the second authentication factor 104b. Additionally, the processing device 402 can transmit the second authenticator factor 104b to the target device 108 using a connection 106 that communicatively couples the processing device 402 with the target device 108. For example, if both the target device 108 and the computing device 110 are Bluetooth-enabled, the user 112 can establish a Bluetooth connection as the connection 106 between the computing device 110 and the target device 108.

The computing device 110 may include a keyboard emulation software (e.g., the keyboard emulation software 120 of FIG. 1) to convert the second authentication factor 104b to a sequence of simulated key presses (e.g., the sequence of simulated key presses 102 of FIG. 1). For example, the keyboard emulation software can use a Bluetooth keyboard library to generate the sequence of simulated key presses. In some examples, the sequence of simulated key presses can simulate the user 112 manually typing the second authentication factor 104b on a Bluetooth-connected keyboard.

After being generated by the computing device 110, the sequence of simulated key presses can then be transmitted to the target device 108 to input the second authentication factor 104b, thereby verifying the identity of the user 112. Alternatively, the target device 108 may include the keyboard emulation software such that the target device 108 converts the second authentication factor 104b from the computing device 110 into the sequence of simulated key presses. The keyboard emulation software can have access to the GUI 118 to input the sequence of simulated key presses as the second authentication factor 104b.

The target device 108 can generate a graphical user interface (GUI) to enable the user 112 or the target device 108 to input the second authentication factor 104b. For example, the user 112 may manually type the second authentication factor 104b into an input box 122 of the GUI 118. Alternatively, the target device 108 can input the sequence of simulated key presses into the input box 122 to verify the identity of the user 112. If the second authentication factor 104b is validated by the target device 108, the user 112 can be granted access to the account 114 or another suitable protected computing resource.

Figure 5:
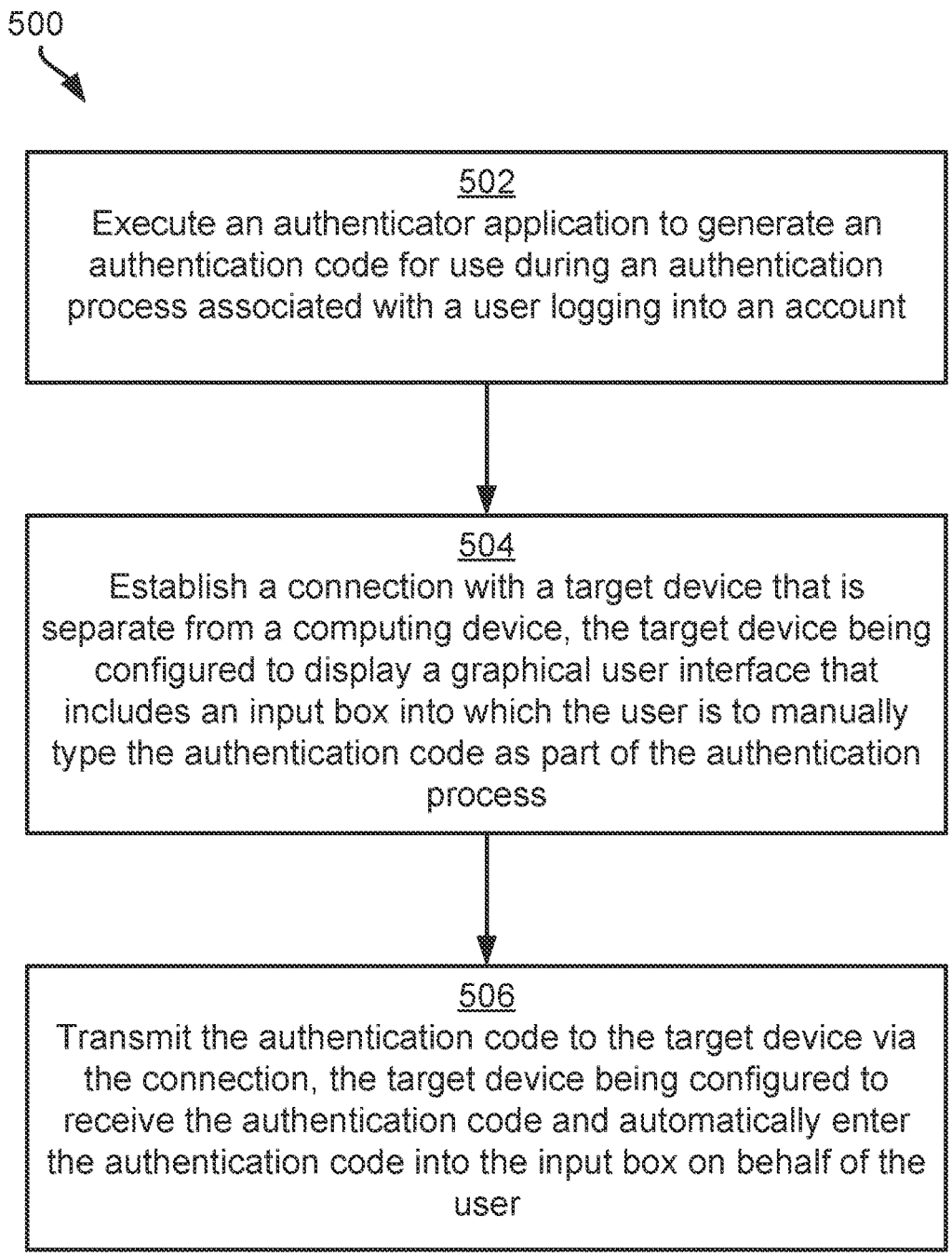
FIG. 5 is a flowchart of an example of a process for automatically inputting an authentication code for an authentication process according to one example of the present disclosure.

FIG. 5 is a flowchart of a process for automatically inputting an authentication code for an authentication process according to one example of the present disclosure. In some examples, a processing device 402 in a computing device 110 can perform one or more of the steps shown in FIG. 5. In other examples, the processing device 402 can implement more steps, fewer steps, different steps, or a different order of the steps depicted in FIG. 5. The steps of FIG. 5 are described below with reference to components discussed above in FIGS. 3 and 4.

At block 502, the processing device 402 executes an authenticator application 116 to generate an authentication code 302 for use during an authentication process associated with a user 112 logging into an account 114. In some examples, the authenticator application 116 may generate a different authentication code after a predetermined amount of time if the authentication code 302 is not used within the predetermined amount of time.

The user 112 can initiate the authentication process in any suitable manner, for example by pushing a button or inputting a first authentication factor 104a into a target device 108 to log into the account 114. For example, the user 112 may use an input device (e.g., a keyboard) communicatively coupled with the target device 108 to type a username and a password into a GUI 118 of the target device 108. After the first authentication factor 104a is validated by the target device 108 or another suitable computing device, the user 112 may receive a request to input a second authentication factor 104b (e.g., the authentication code 302) for multifactor authentication. For example, after validating that the username matches the password and that the first authentication factor 104a corresponds to an authorized user, the target device 108 may prompt the user 112 to provide a biometric marker (e.g., a fingerprint or face scan).

At block 504, the processing device 402 establishes a connection 106 with the target device 108 that is separate from the computing device 110. For example, if the computing device 110 is within a predefined range of the target device 108, a Bluetooth connection may be automatically established to communicatively couple the computing device 110 with the target device 108. In some examples, the target device 108 can transmit an authentication request to the computing device 110 via the connection 106, thereby causing the computing device 110 to generate or transmit the authentication code 302 to the target device 108. Additionally, or alternatively, the user 112 may cause the computing device 110 to generate or transmit the authentication code 302 to the target device 108 using an activation measure (e.g., a key press, speaking a key phrase, etc.). The target device 108 can display an input box 122 of the GUI 118 into which the user 112 is to manually type the authentication code 302 as part of the MFA process.

At block 506, the processing device 402 transmits the authentication code 302 to the target device 108 via the connection 106. In some examples, the processing device 402 may establish an encrypted connection separate from the connection to relatively securely transmit the authentication code 302 to the target device 108. After receiving the authentication code 302, the target device 108 can automatically enter the authentication code 302 into the input box 122 on behalf of the user 112.

In some examples, the target device 108 can convert the authentication code 302 into a sequence of simulated key presses 102. Using the sequence of simulated key presses 102, the target device 108 can automatically enter the authentication code 302 into the input box 122 of the GUI 118 or another suitable location in the target device 108 on behalf of the user 112. For example, the authenticator application 116 can generate an alphanumeric authentication code with twelve characters that is converted into the sequence of simulated key presses 102 by the keyboard emulation software 120. The sequence of simulated key presses 102 may include an order of pressing keys to input the alphanumeric authentication code in addition to which keys to press to input the twelve characters. By using the sequence of simulated key presses 102, the alphanumeric authentication code can be longer than a typical authentication code that is manually inputted by the user 112, thereby increasing security with respect to accessing the account 114.

Additionally or alternatively, the target device 108 may receive the authentication code 302 as the sequence of simulated key presses 102 generated by the keyboard emulation software 120 in the computing device 110. In such examples, the keyboard emulation software 120 can communicate with the authenticator application 116 to receive the authentication code 302 from the authenticator application 116. After receiving the sequence of simulated key presses 102 from the computing device 110, the target device 108 can input the authentication code 302 into the input box 122 using the sequence of simulated key presses 102. Automatically entering the authentication code 302 into the input box 122 can streamline the MFA process, thereby minimizing a likelihood of input error by the user 112.

Additionally, streamlining the MFA process can decrease a likelihood of the user 112 bypassing the MFA process.

The above process employs multiple layers of authentication to improve security—a first layer in which the user 112 authenticates with the target device 108 using the first authentication factor 104a and a second layer in which the computing device 110 authenticates with the target device 108 using the second authentication factor 104b. The target device 108 and the computing device 110 additionally may employ other security mechanisms, such as encrypting communication across the connection 106 between the target device 108 and the computing device 110. This security architecture can prevent malicious actors from accessing the account or other protected computing resources while facilitating multifactor authentication for the user 112 by automating a process for inputting the second authentication factor 104b.

It will be appreciated that although various examples are described herein in relation to a multifactor authentication process in which the authentication code is the second factor, in other examples the authentication code may be another factor (e.g., a first factor) in the multifactor authentication process or the sole factor in a single-factor authentication process. Additionally, while the figures depict a specific arrangement of components, other examples can include more components, fewer components, different components, or a different arrangement of the depicted components. For instance, in other examples for FIG. 1, the system 100 may include multiple target devices to which the computing device 110 can transmit authentication codes.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
a processing device; and
a memory device including instructions that are executable by the processing device for causing the processing device to:
execute an authenticator application to generate an authentication code for use during an authentication process associated with a user logging into an account;
establish a connection with a target device that is separate from the computing device, the target device being configured to display a graphical user interface that includes an input box into which the user is to manually type the authentication code as part of the authentication process; and
transmit the authentication code to the target device via the connection, the target device being configured to receive the authentication code and automatically enter the authentication code into the input box on behalf of the user, wherein the authentication code is automatically entered by the target device using a sequence of simulated key presses generated using keyboard emulation software.

2. The computing device of claim 1, wherein the memory device further includes instructions that are executable by the processing device for causing the processing device to:
transmit the authentication code to the target device as the sequence of simulated key presses generated using the keyboard emulation software.

3. The computing device of claim 1, wherein the target device is configured to automatically enter the authentication code into the input box as the sequence of simulated key presses generated using the keyboard emulation software.

4. The computing device of claim 1, wherein the connection is a wireless connection.

5. The computing device of claim 4, wherein the wireless connection is a Bluetooth connection.

6. The computing device of claim 1, wherein the connection is a wired connection.

7. The computing device of claim 6, wherein the wired connection is a universal serial bus (USB) connection.

8. The computing device of claim 1, wherein the computing device is a smart phone, a tablet, a smart watch, or a laptop computer.

9. The computing device of claim 1, wherein the target device is a desktop computer, a laptop computer, a smart phone, a tablet, or a smart watch.

10. A method comprising,
executing, by a processing device, an authenticator application to generate an authentication code for use during an authentication process associated with a user logging into an account;
establishing, by the processing device, a connection with a target device that is separate from a computing device comprising the processing device, the target device being configured to display a graphical user interface that includes an input box into which the user is to manually type the authentication code as part of the authentication process; and
transmitting, by the processing device, the authentication code to the target device via the connection, the target device being configured to receive the authentication code and automatically enter the authentication code into the input box on behalf of the user, wherein the authentication code is automatically entered by the target device using a sequence of simulated key presses generated using keyboard emulation software.

11. The method of claim 10, further comprising:
transmitting the authentication code to the target device as the sequence of simulated key presses generated using the keyboard emulation software.

12. The method of claim 10, wherein the target device is configured to automatically enter the authentication code into the input box as the sequence of simulated key presses generated using the keyboard emulation software.

13. The method of claim 10, wherein the connection is a wireless connection.

14. The method of claim 13, wherein the wireless connection is a Bluetooth connection.

15. The method of claim 10, wherein the connection is a wired connection.

16. The method of claim 15, wherein the wired connection is a universal serial bus (USB) connection.

17. The method of claim 10, wherein the computing device is a smart phone, a tablet, a smart watch, or a laptop computer.

18. The method of claim 10, wherein the target device is a desktop computer, a laptop computer, a smart phone, a tablet, or a smart watch.

19. A non-transitory computer-readable medium comprising instructions that are executable by a processing device of a computing device for causing the processing device to:
execute an authenticator application to generate an authentication code for use during an authentication process associated with a user logging into an account;

establish a connection with a target device that is separate from the computing device, the target device being configured to display a graphical user interface that includes an input box into which the user is to manually type the authentication code as part of the authentication process; and transmit the authentication code to the target device via the connection, the target device being configured to receive the authentication code and automatically enter the authentication code into the input box on behalf of the user, wherein the authentication code is automatically entered by the target device using a sequence of simulated key presses generated using keyboard emulation software.

20. The non-transitory computer-readable medium of claim 19, further comprising instructions that are executable by the processing device for causing the processing device to:

transmit the authentication code to the target device as the sequence of simulated key presses generated using the keyboard emulation software.

\* \* \* \* \*